United States Patent [19]
Alberti

[11] 4,416,579
[45] Nov. 22, 1983

[54] POWER-ACTUATED LOW PROFILE CARGO GUIDE

[75] Inventor: John Alberti, Seattle, Wash.

[73] Assignee: The Boeing Company, Seattle, Wash.

[21] Appl. No.: 278,478

[22] Filed: Jun. 29, 1981

[51] Int. Cl.³ .......................... B60P 1/64; B63B 25/22
[52] U.S. Cl. ....................................... 414/534; 410/94
[58] Field of Search ...................... 410/69, 70, 77, 78, 410/92, 94; 414/467, 529, 534, 536

[56] References Cited

U.S. PATENT DOCUMENTS

| | | | |
|---|---|---|---|
| 2,439,423 | 4/1948 | Fowler | 244/118 |
| 2,692,744 | 10/1954 | Burkhard | 244/137 |
| 2,774,560 | 12/1956 | Johnson | 244/138 |
| 3,093,092 | 5/1963 | Martin et al. | 105/369 |
| 3,233,761 | 2/1966 | McCartney et al. | 414/536 |
| 3,335,983 | 8/1967 | Mollon et al. | 244/137 |
| 3,357,372 | 12/1967 | Bader | 105/369 |
| 3,399,921 | 12/1967 | Trost et al. | 410/69 |
| 3,424,410 | 1/1969 | Galaup | 244/137 |
| 3,693,920 | 9/1972 | Trautman | 410/92 |
| 3,884,374 | 5/1975 | Swallow, Jr. | 414/536 |
| 4,000,870 | 1/1977 | Davies | 410/92 |
| 4,009,792 | 3/1977 | Sano et al. | 414/536 X |
| 4,013,017 | 3/1977 | Toyota et al. | 410/78 |
| 4,144,821 | 3/1979 | Lang | 105/465 |

Primary Examiner—Robert B. Reeves
Assistant Examiner—David F. Hubbuch
Attorney, Agent, or Firm—Christensen, O'Connor, Johnson & Kindness

[57] ABSTRACT

A cargo guide assembly includes a base which is mountable to the floor of a cargo hold in a transport vehicle such as an aircraft. A guide rail is pivotally attached to the base for swinging movement between a first position in which the guide rail contacts the side of a cargo container in the cargo hold, thereby restraining movement of the cargo and a second position in which the guide rail lies below the cargo floor, thereby permitting cargo to pass over it. A powered actuator is mounted on the base and is coupled to the guide rail by actuation linkage operable to move the guide rail from its first to its second position. Preferably, the assembly includes a latch for latching the guide rail in its second position and a biasing device associated with the base to bias the guide rail toward its first position. A plurality of the cargo guide assemblies can be installed in a cargo hold and the actuators of each of the assemblies connected to a common control station so that the cargo guide assemblies can each be operated independently or in groups from the control station.

8 Claims, 8 Drawing Figures

U.S. Patent  Nov. 22, 1983  Sheet 1 of 2  4,416,579
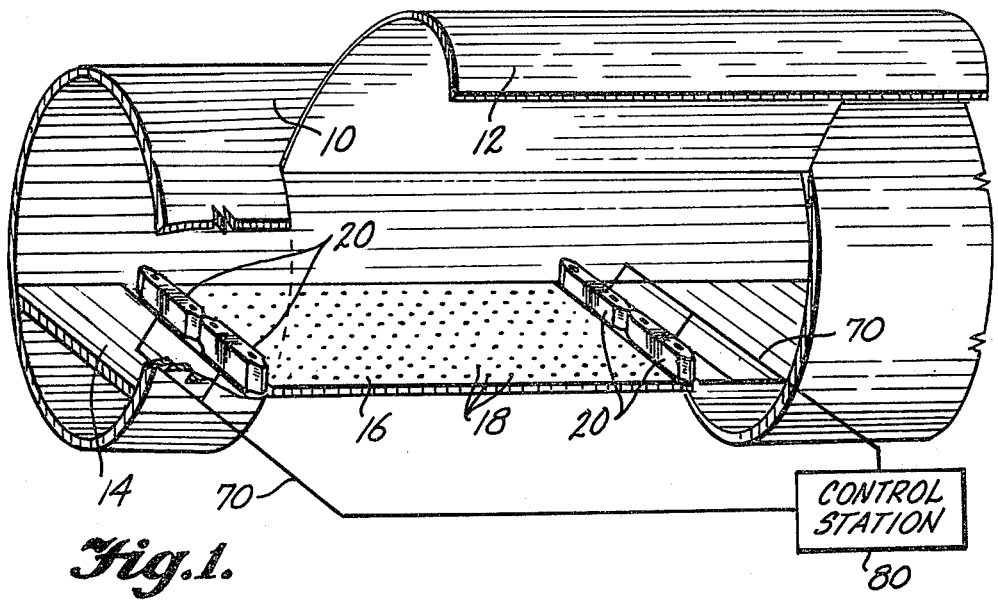
Fig. 1.
Fig. 2.
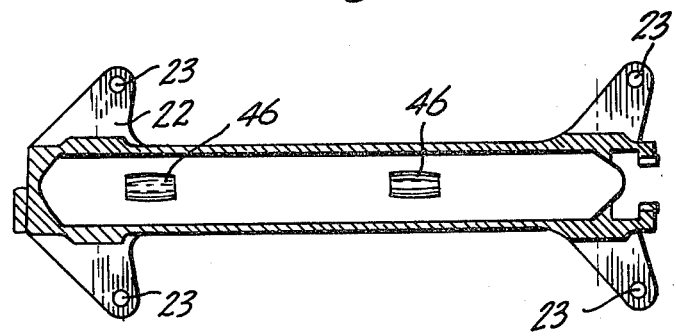
Fig. 3.  Fig. 4.
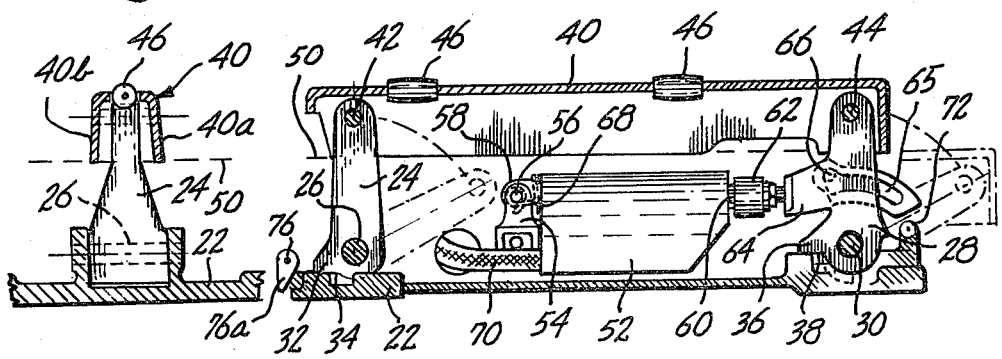

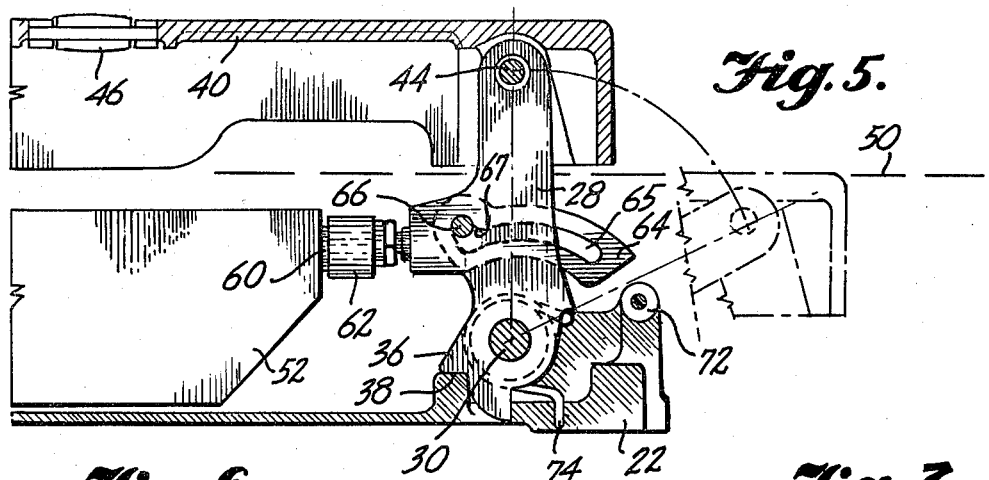
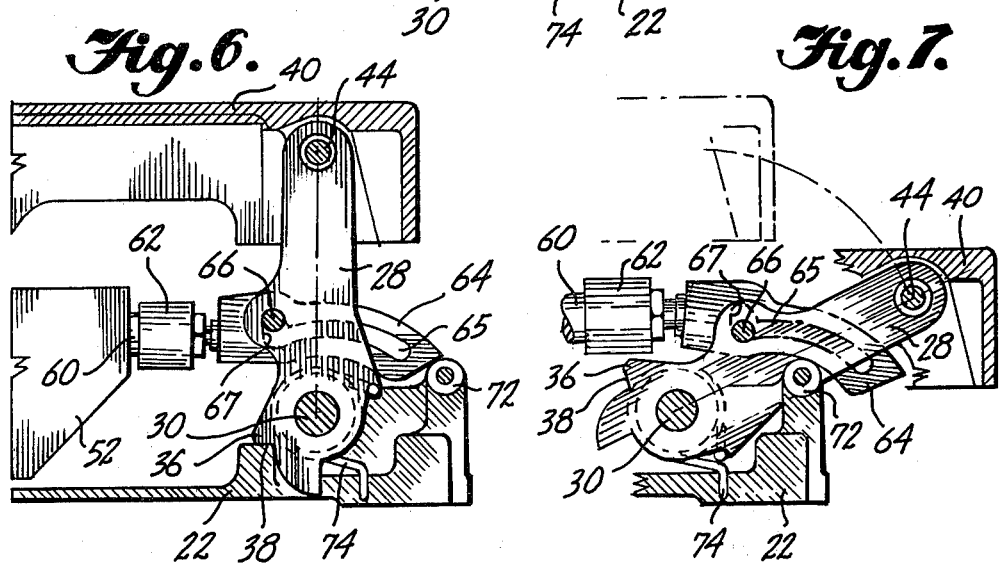
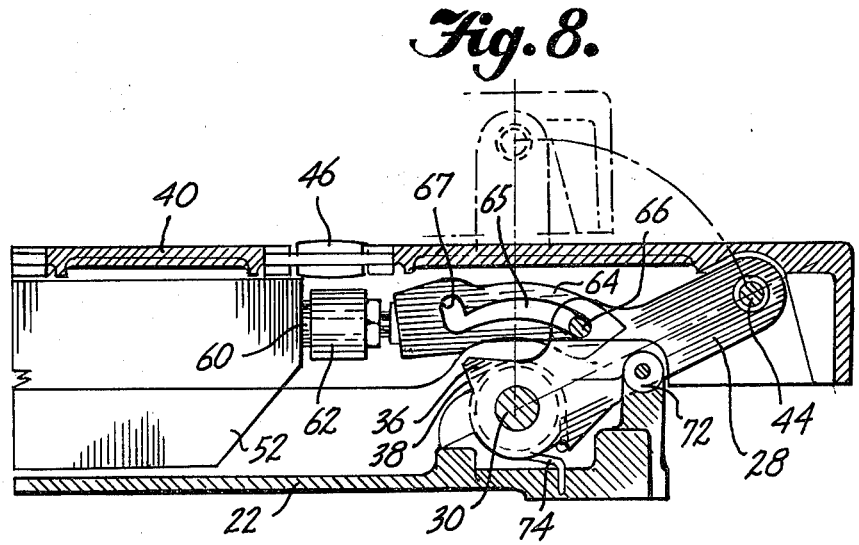

POWER-ACTUATED LOW PROFILE CARGO GUIDE

BACKGROUND OF THE INVENTION

This invention relates to apparatus for guiding cargo to a desired position within a cargo hold of a transportation vehicle such as an aircraft and, more particularly, relates to a cargo guide which is power actuated to and from a position of engagement with cargo containers entering the cargo hold and is preferably operated from a remote location.

Typically, the floor of a cargo hold of a transportation vehicle such as a cargo aircraft is comprised of a plurality of ball mats which permit cargo containers to be moved omni-directionally on the floor of the cargo hold. The containers are generally loaded from the side of the aircraft through a cargo door and, once inside the cargo hold, are then moved fore-and-aft to desired positions within the cargo hold. In order to prevent the containers from moving fore-and-aft until they have reached the desired lateral location within the cargo hold, it is necessary to provide some guiding and restraining means which engages the cargo container on either side and guides it in a straight line as it moves from the cargo door laterally across the cargo hold. This is particularly necessary in aircraft since at times the attitude of the aircraft will be slightly nose or tail down, thereby providing an inclined plane along which the cargo container could slide if it were not restrained by some type of guide assembly.

Once the container has been laterally positioned in the cargo hold the guide assembly must then be adapted to either be completely removed or at least capable of movement to a position of non-engagement with the cargo container so that the container can be moved in a fore-aft direction to its desired final position in the cargo hold.

Prior art guide assemblies have generally been integrally formed in the floor structure of the cargo hold and have been difficult to service and replace due to the extensive disassembly required for removal and reinstallation. Further, it is desirable that the guide assembly be actuatable from a remote location to move it between its respective positions of engagement and non-engagement with the cargo containers. Remote actuation lessens the possibility of personnel hazard by maintaining the cargo handlers' location spaced from the actual containers. For example, when the guide assembly is moved to its position of non-engagement the container may accidentally begin to move and come into contact with the cargo-loading personnel, if those personnel are in close proximity to the container, with the possible result of an injury to such personnel. The remote actuation feature reduces the hazard potential by keeping the personnel away from the containers. Also, prior art guide assemblies have been typically ganged to a single actuator so that all the assemblies were operated in unison.

It is, therefore, an object of the present invention to provide a power-actuated guide assembly having a cargo-engaging position in which it acts to guide the cargo into the cargo hold in a transverse direction while restraining it from motion in a fore-aft direction.

It is a further object of this invention to provide such a guide assembly which is remotely operable either independently or in unison with other guide assemblies for movement of such assemblies between a cargo-engaging position and a position out of engagement with the cargo.

It is another object of this invention to provide such a guide rail assembly which includes the capability of manual operation in the event of power failure or actuator failure.

It is another object of this invention to provide such a guide rail assembly which is easily mountable and demountable from the cargo hold for maintenance and service.

SUMMARY OF THE INVENTION

In accordance with the objects set forth above, a cargo guide assembly is provided comprising a base which is mountable to the cargo floor of a cargo hold. A guide rail is pivotally mounted on the base for swinging movement between a first position in which said guide rail engages a cargo container in said cargo hold and a second position in which said guide rail is positioned below the plane of the cargo floor, thereby permitting movement of the cargo container over said guide rail. A powered actuation means is mounted on said base and coupled to the guide rail by an actuation linkage operable to move the guide rail from its first position to its second position.

In a preferred embodiment the cargo guide includes a latching means associated with the base, operable to lock said guide rail in its second position, and also includes a biasing means associated with the guide rail and the base, which biasing means tends to force said guide rail to its first position.

BRIEF DESCRIPTION OF THE DRAWINGS

The invention disclosed herein will be better understood by those of ordinary skill in the art and others upon reading the ensuing specification taken in conjunction with the accompanying drawings wherein:

FIG. 1 is a somewhat schematic view of a portion of an aircraft cargo hold having cargo guides made in accordance with the principles of the present invention installed therein;

FIG. 2 is a plan view of a cargo guide assembly made in accordance with the principles of the present invention;

FIG. 3 is a front elevational view in partial section of a cargo guide assembly made in accordance with the principles of the present invention;

FIG. 4 is a side elevational view of the cargo guide assembly of FIGS. 2 and 3;

FIG. 5 is a side elevational view of a portion of the cargo guide assembly of FIG. 4 in a somewhat expanded scale;

FIG. 6 is a side elevational view of a portion of the cargo guide of FIG. 4;

FIG. 7 is a side elevational view of a portion of the cargo guide assembly of FIG. 4; and FIG. 8 is a side elevational view of a portion of the cargo guide assembly of FIG. 4.

DETAILED DESCRIPTION OF THE PREFERRED EMBODIMENT

It must be noted that, while the preferred embodiment of the present invention is described with reference to and in the environment of an aircraft cargo hold, the cargo guide of the present invention is suitable for use in substantially any type of cargo vehicle having a cargo hold in which it is desirable to maintain cargo in a desired linear path and is later desired to allow movement of the cargo in a path substantially orthogonal to the original path. Therefore, the description of the preferred embodiment of the present invention with relation to aircraft is meant to be exemplary only and is not meant to be limiting.

FIG. 1 shows a portion of a typical aircraft fuselage and, in particular, shows an entrance to the cargo hold of such an aircraft. The fuselage 10 has a cargo opening formed therein and includes a cargo door 12 movable into a first position blocking the cargo hold and a second position spaced from the cargo hold opening to permit entry of cargo into the hold. FIG. 1 shows the cargo door 12 in its open or second position. Typically, the floor 14 of such cargo hold will be comprised of a series of ball mats 16 which have ball rollers 18 positioned therein to permit omni-directional planar movement of a cargo container or other item in the hold. A pair of guide rail assemblies 20 is positioned on either side of the cargo opening, preferably, the respective pairs are spaced apart along the fore-aft dimension of the aircraft, a distance approximately equal to the width of a cargo container, so that upon entry of a cargo container into the hold, the sides of the container will be in close proximity to the respective pairs of the cargo guide assemblies 20. Once the cargo container has entered the cargo hold it is desirable to move that container either forward or aft in the cargo hold to a final position which the container will assume during transport. In order to accomplish the fore-aft movement, it is necessary to move the cargo guide assembly 20 out of engagement with the cargo container along the desired side for either forward or aft movement. It should be noted that in FIG. 1, the scaling of the cargo guide assemblies 20, cargo hold and fuselage 10 are exemplary only and should not be taken as representative of the actual dimensional relationship between the aircraft and the cargo guide assemblies. Also, the number of guide assemblies is exemplary only.

FIGS. 2, 3 and 4 show in orthographic projection one embodiment of a cargo guide assembly manufactured in accordance with the principles of the present invention. A base 22 is adapted for easy mounting and demounting to the cargo hold floor, for example, by bolts (not shown) which can be passed through holes 23 formed in the base and threaded into suitably formed holes in the floor structure. A first mounting pawl 24 is pivotally mounted on the base 22 at a first end thereof by means of a mounting pin 26. A second mounting pawl 28 is pivotally mounted on the base 22 at a second end thereof by means of a mounting pin 30. The respective mounting pawls 24 and 28 are pivotable from an erect position, shown in solid lines in FIG. 4, to a position in which they are oblique to the plane of the base 22, as shown by the phantom lines in FIG. 4. The pawl 24 has an abutment 32 formed adjacent a first end thereof. The abutment 32 has a stop surface 34 which engages the base when the first mounting pawl 24 is in the erect position to prevent its movement in a counterclockwise direction, as viewed in FIG. 4. A similar abutment 36 is formed on the first end of the second mounting pawl 28 and has a stop surface 38 which engages the base when the second mounting pawl is in its erect position to prevent its movement in a counterclockwise direction, as viewed in FIG. 4. A guide rail 40 is pivotally mounted at a first end thereof to the first mounting pawl 24 by means of a pivot pin 42 and mounted to the second mounting pawl 28 at a second end thereof by mounting pin 44. Preferably, the guide rail 40 has a pair of cylindrical rollers 46 rotatably mounted thereon extending above the guide rail 40, the purpose of which will be discussed below. As best seen in FIG. 3, the sides 40a and 40b of the guide rail diverge from one another as they extend toward the base 22, thereby giving the guide rail a taper. The purpose of the taper will be discussed below.

The plane of the cargo floor 14 is shown by dashed line 50 in FIGS. 3 and 4. It will be noted that when the mounting pawls 24 and 28 are moved to their oblique position the guide rail 40 lies below the plane of the cargo floor, as shown in phantom lines in FIG. 4. An actuator 52 is mounted to a mounting bracket 54 which, in turn, is affixed to the base 22. The actuator 52 is attached to the mounting brackets 54 by means of a quick release pin 56 which passes through the bracket 54 and a mounting piece 58 on the actuator. The actuator is pivotally mounted so it can rotate about the quick release pin 56. An extensible rod 60 is included in the actuator 52 and is extensible from within the body of the actuator 52. A rod head 62 is affixed to a first end of the extensible rod 60 which extends from the actuator body. An actuation link 64 is affixed to the rod head 62 and has a curved slot formed therein which cooperates with an actuation pin 66 formed on the second mounting pawl 28. An actuator bias spring 68 cooperates with the mounting bracket 54 and the actuator 52, tending to force the actuator to rotate in a clockwise direction, as viewed in FIG. 4, about the quick release pin 56. The rotation of the actuator is restrained by the interaction of actuation pin 66 and the side of the curved slot formed in the actuation link 64. In the illustrated embodiment, the actuator 52 is electrically operated and a power cable 70 connects the actuator to a suitable source of electrical power, which source of power can be remotely controlled so that the operation of the cargo guide assembly can therefore be remotely controlled. Typically, several cargo guide assemblies will be used in a single cargo hold and while each cargo guide assembly has its own actuator, the several actuators of all the cargo guide assemblies will be connected to a common control station 80 so that the actuators and therefore the cargo guide assemblies can be operated independently or in unison from a single control station.

Referring now to FIGS. 5-8, the cargo guide assembly 20 is shown in various operating conditions with the guide rail 40 in both its cargo-engaging position, as in FIGS. 5 and 6, and in its retracted position out of engagement with the cargo container and substantially below the plane of the cargo hold floor, as in FIGS. 7 and 8.

FIG. 5 is a side elevational view of a portion of the cargo guide assembly shown in FIG. 4 and in substantially the same operational condition as pictured in FIG. 4, the scaling of FIG. 5 is slightly increased to better show the operation of the actuation linkage which moves the guide rail from its cargo-engaging position to its retracted position. In FIG. 7 the guide rail 40 is shown in its retracted position out of engagement with the cargo and with the second mounting pawl 28 in its oblique position with respect to the base 22. To move the second mounting pawl 28 and, thereby the guide rail, to the position shown in FIG. 7 the actuator 52 is operated to extend the extensible rod 60 from the body of the actuator, thereby moving the actuation link 64 to the right, as viewed in FIGS. 5-8. The first end of the slot formed in the actuation link 64 bears against the actuation pin 66 and pushes the actuation pin to the right along with the movement of the actuation link 64. The movement of the pin 66 carries with it the second mounting pawl 28 which pivotally rotates in a clockwise direction, as viewed in FIGS. 5 and 7, to the position shown in solid lines in FIG. 7 and in phantom lines in FIG. 5. The second mounting pawl carries with it the guide rail 40. The second mounting pawl 28 is maintained in the position shown in FIG. 7 by the extension of the extensible rod 62 from the actuator body. When the guide rail is retracted in the position shown in FIG. 7 the cargo container can pass over the guide rail 40 to its desired position within the hold. When the guide rail is retracted, the rollers 46 mounted on the guide rail 40 will extend above the guide rail and into the path of the cargo, contacting the bottom of the cargo container to reduce the friction between the container and the guide rail assembly and ease its travel over the guide rail 40. As discussed earlier, the guide rail 40 has a tapered cross section formed by sides 40a and 40b diverging as they extend toward the base 22. The taper provides a quick breakaway of the guide rail from the side of the cargo container as the guide rail is powered to its retracted position, thereby preventing hangups of the guide rail on the edge of the cargo container or pallet base.

Still referring to FIG. 5, the slot 65 in the actuator link 64 has a detent portion 67 formed in a first end thereof. When the guide rail is in its cargo-engaging position and the second mounting pawl 28 is in its upright position, as shown in FIG. 5, the action of the actuator bias spring 68 tends to pivot the actuator clockwise about quick release pin 56 to maintain the position of the actuator such that the actuation pin 66 is engaged in the detent portion 67 of the slot 65. The second mounting pawl 28 is therefore positively latched in its upright position since it cannot move in the counterclockwise position due the engagement of stop surface 38 with the base 22 and cannot move in the clockwise direction because of the engagement of pin 66 with the surface of the detent portion 67 of the slot 65. When the rod 62 is extended from the actuator 52 the actuator link 64 is forced to the right, as viewed in FIG. 5 and, in turn, the actuator link 64 exerts a force tending to move the first actuation pin 66 to the right, which force is transferred to the second mounting pawl 28, thereby rotating the second mounting pawl 28 in a clockwise direction, as viewed in FIG. 5. The second mounting pawl carries with it the guide rail 40.

As the actuation link 64 moves to the right due to the extension of the rod 60 from the actuator, a lower cam surface of the actuator link rides over a cam roller 72 mounted on the second end of the base 22. The cam action between the lower surface of the actuation link 64 and the cam roller 72 moves the actuation link upwardly, as viewed in FIG. 7, to thereby disengage the actuation pin 66 from the detent portion 67 of the slot 65 and place it in the main body of the slot 65, as best seen in FIG. 7. Since the pin 66 is no longer in the detent portion 67, the actuation link 64 can be moved to the left, as viewed in FIG. 7, without exerting any force on the actuation pin 66. Therefore, once a cargo container is positioned above the guide rail 40 it will, by its weight, maintain the guide rail in a position below the cargo floor plane even though the actuator link 64 has been returned to its initial position. This condition is best seen in FIG. 8. In this condition, the actuation pin 66 is in the second end of the slot 65 opposite the detent portion 67.

Preferably, a mounting pawl bias spring 74 is mounted in association with the pivot pins 30, base 22 and second mounting pawl 28 to bias the second pawl towards its upright position. In the preferred operation the rod 60 is retracted into the actuator sometime prior to the completion of passage of the cargo container over the guide rail 40. After the cargo container has passed over the guide rail 40 and the guide rail is no longer held down by the container weight, bias spring 74 will exert a force on the second mounting pawl 28 which returns the second mounting pawl to its upright position, as shown in FIG. 6. The actuator bias spring 68 then acts to move the actuation link 64 downwardly a sufficient amount to position the actuation pin 66 in the detent portion 67 of the slot 65, thereby again locking the second mounting pawl in its erect position.

In the event of a power failure, it may still be desirable to operate the cargo guide assembly by hand so that cargo loading can be continued despite the power failure. Such manual operation can be performed by manually forcing the actuator link 64 upward sufficiently to release the actuation pin 66 from the detent portion 67 and then applying force to the guide rail assembly to rotate the first and second mounting pawls in a clockwise direction, thereby moving the guide rail 40 to its lowermost position below the cargo floor plane. When the guide rail is in its lowermost position, a latching pawl 76 pivotally mounted on the base 22 and best seen in FIG. 4 can be rotated so that a first end 76a of the latching pawl engages the stop surface 34 of the first mounting pawl 24 and prevents counterclockwise rotation of the first mounting pawl, thereby maintaining the guide rail in its lowermost position. When it is desired to move the guide rail back to its cargo-engaging position the latching pawl 76 can be manually rotated so that the first end 76a no longer contacts the stop surface 34 and the cargo guide assembly will then move to its cargo-engaging position by action of the mounting pawl biasing spring 74 which exerts a force on the second mounting pawl 28 to rotate it in a counterclockwise direction, as viewed in FIG. 4.

Should the actuator 52 fail in a retracted position, as shown in FIG. 4, manual operation of the cargo guide assembly would proceed as described above. If, however, the actuator fails with the rod 60 extended from the actuator, and locked in that position, it would be necessary to disconnect the actuator from the cargo guide assembly in order to manually release the second mounting pawl and allow it to return to its upright position. The actuator 52 is preferably mounted by means of a quick release pin 56 so that, in the event the actuator does fail with the rod extended, the quick release pin 56 can be removed leaving the actuator free to move fore-and-aft in relation to the cargo guide base 22, thereby allowing manual operation of the cargo guide assembly.

In summary, therefore, a cargo guide assembly is provided which includes a base which is easily mountable to and demountable from the floor structure of a cargo hold. The base has mounted upon it two mounting pawls which, in turn, have mounted thereto a guide rail. The mounting pawls are pivotally movable to a position in which the guide rail is below the plane of the cargo hold floor to permit passage of cargo over the top of the cargo guide assembly. Preferably, a powered actuator is mounted on the base and is associated with the mounting pawls through an actuation linkage such that the actuator is operable to move the cargo rail between its cargo-engaging position and its position below the plane of the cargo hold floor. At least one of the cargo mounting pawls is spring biased to its upright position and, preferably, the cargo guide assembly is capable of manual operation in the event of power failure or actuator failure.

While a preferred embodiment of the present invention has been described and illustrated, it should be apparent to those of ordinary skill in the art that many changes can be made to the preferred embodiment while remaining within the scope of the present invention. For example, while the actuator described and illustrated is of the electrical type, such actuator can also be of a pneumatic or hydraulic type. The scope of the present invention should therefore be determined solely by reference to the appended claims.

The embodiments of the invention in which an exclusive property or privilege is claimed are defined as follows:

1. A cargo guide assembly for restraining movement of cargo in a cargo hold comprising:
   a base;
   a guide rail;
   first means for mounting said guide rail to said base for movement of said guide rail between a first position in which said guide rail engages and restrains the movement of said cargo and a second position in which said guide rail is out of restraining engagement with said cargo, said first means including a first mounting pawl pivotally mounted on said base for swinging movement between an erect position in which said first mounting pawl is substantially orthogonal to said base and a retracted position in which said first mounting pawl is substantially oblique to said base, a second mounting pawl having an actuation pin formed thereon, said second mounting pawl being pivotally mounted on said base for swinging movement between an erect position in which said second mounting pawl is substantially orthogonal to said base and a retracted position in which said second mounting pawl is substantially oblique to said base, said guide rail being pivotally mounted at a first end to said first mounting pawl and at a second end to said second mounting pawl, said first and second mounting pawls being held in substantially parallel relation by said guide rail such that said first and second mounting pawls move in unison, said guide rail being in its first position when said first and second mounting pawls are in their respective erect positions and said guide rail being in its second position when said first and second mounting pawls are in their respective retracted positions;
   actuator means mounted on said base, said actuator means being operable from a remote location to move said guide rail from its first position toward its second position, said actuator means including an actuator body and an extensible rod mounted within said actuator body, said extensible rod being operable for extension from said actuator body and retraction into said actuator body;
   actuator linkage means affixed to said extensible rod and connecting said actuator means to said second mounting pawl so that operation of said actuator means to extend and retract said extensible rod moves said second mounting pawl between its erect and retracted positions, said linkage means including an actuation link affixed to said extensible rod, said actuation link having an elongate slot formed therein, said actuation pin of said second pawl engaging a first end of said slot when said second mounting pawl is in its erect position, and said actuation link exerting a force on said actuation pin through the surface defining said first end of said slot to move said second pawl toward its retracted position; and
   first biasing means associated with said base and said guide rail for biasing said guide rail toward its cargo-restraining position.

2. The cargo guide assembly of claim 1 wherein said elongate slot has a detent portion formed at the first end thereof and further including:
   second biasing means associated with said actuator to bias said actuation link such that said actuation pin is engaged in said detent portion when said second mounting pawl is in its erect position to provide a positive lock preventing rotation of said second mounting pawl.

3. The cargo guide assembly of claim 2 wherein said actuator body is mounted to said base by means of a quick release pin.

4. The cargo guide assembly of claim 2 further including latching means associated with said base and said first mounting pawl, operable to latch said first pawl in its retracted position.

5. The cargo guide assembly of claim 4 further including at least one anti-friction roller mounted on said cargo rail for engagement with said cargo when said cargo rail is in its second position.

6. The cargo guide assembly of claim 2 wherein said actuator means is an electrically powered linear actuator.

7. The cargo guide assembly of claim 1 wherein said guide rail includes a first cargo-engaging side and a second cargo-engaging side, said sides being spaced from one another and diverging as they extend toward said base to provide said guide rail with a tapered cross section to provide minimum contact area of said guide rail with said cargo.

8. A cargo guide system for use in a cargo hold to selectively guide the movement of cargo in the hold and to selectively restrain movement of the cargo, said cargo guide system comprising:
   a plurality of cargo guide assemblies, each such cargo guide assembly including a base, a guide rail, first means for mounting said guide rail to said base for movement of said guide rail between a first position in which said guide rail engages and restrains the movement of said cargo and a second position in which said guide rail is out of restraining engagement with said cargo, said first means including a first mounting pawl pivotally mounted on said base for swinging movement between an erect position substantially orthogonal to said base and a retracted position substantially oblique to said base, a second mounting pawl having an actuation pin formed thereon, said second pawl being pivotally mounted on said base for swinging movement between an erect position substantially orthogonal to said base and a retracted position substantially oblique to said base, said guide rail being pivotally mounted at a first end to said first mounting pawl and at a second end to said second mounting pawl, said mounting pawls being held in substantially parallel relation to one another by said guide rail such that said pawls move in unison, said guide rail being in its first position when said first and second mounting pawls are in their respective erect positions and said guide rail being in its second position when said first and second mounting pawls are in their respective retracted positions, actuator means mounted on said base operable to move said guide rail from its first position toward its second position, said actuator means including an actuator body and an extensible rod mounted in said actuator body, said rod being operable for extension from said actuator body and retraction into said actuator body, actuator linkage means affixed to said extensible rod and connecting said actuator means to said second mounting pawl, so that operation of said actuator means to extend and retract said extensible rod moves said second mounting pawl between its erect and retracted position, said linkage means including an actuation link affixed to said extensible rod, said actuation link having an elongate slot formed therein, said actuation pin of said second pawl engaging a first end of said slot when said second mounting pawl is in its erect position, and said actuation link exerting a force on said actuation pin through the surface defining said first end of said elongate slot to move said second pawl toward its retracted position, and first biasing means associated with said base and said guide rail for biasing said guide rail toward its cargo-restraining position;

a control station coupled to all of the actuators associated with each of said cargo guide assemblies, each of said actuators being selectively operable from said control station to selectively position each of said guide rails to their respective second positions to guide said cargo along a selected path through said cargo hold.

* * * * *